Feb. 17, 1931.    J. WAHL    1,792,619
METHOD OF MAKING VALVE STEMS
Filed Aug. 3, 1927
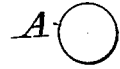
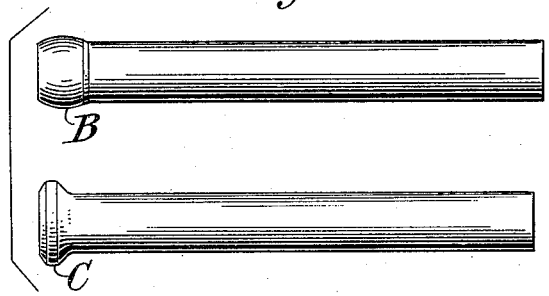
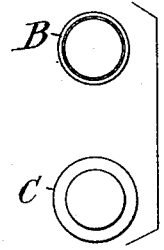
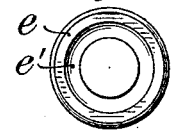
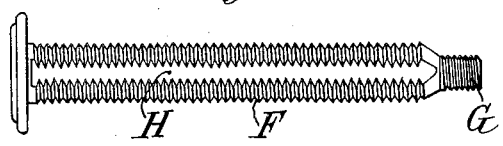
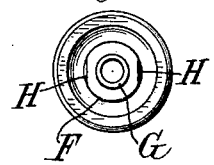
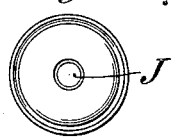
INVENTOR:
John Wahl,
By Attorneys,
Fraser, Myers & Manley Patented Feb. 17, 1931

1,792,619

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

METHOD OF MAKING VALVE STEMS

Application filed August 3, 1927. Serial No. 210,385.

This invention relates to the method of making tire valve stems, and more particularly to the method of forming the foot portion of such stems.

Heretofore tire valve stems have usually been formed from cylindrical solid blanks by subjecting one end thereof to swaging or heading operations to provide them with enlarged flat heads which constituted the foot portions or bases of the stems, which enlarged portions were then finished off and provided on the face adjacent the blank with one or more concentric grooves by a machining operation. This last-named operation, in addition to requiring time and producing scrap metal, also requires the foot to be of sufficient thickness to provide the necessary strength for the valve stem at this point after the foot portion is grooved.

According to the present invention I make the foot portion of the valve stem in such manner as to eliminate the finishing off and grooving machining operations thereon, by forming the groove or grooves in the base by a swaging operation. In this way I am enabled to make the foot portion thinner, without impairing its strength, and thereby realize a substantial saving in the manufacturing cost.

According to my invention I make the valve stem from a blank by subjecting one end thereof to a plurality of swaging or heading operations to form an enlarged foot, and then subjecting said foot to a further swaging operation to displace the metal thereof to provide a plurality of concentric faces disposed in different planes. Preferably the last swaging operation is such as will simultaneously increase the diameter of the foot and provide it with an annular groove on its face adjacent the blank. The invention also embodies other features of novelty which will be hereinafter more fully described.

In the accompanying drawings, wherein I have shown the various stages in the formation of the valve stem,—

Figure 1 shows a blank from which the stem is formed;

Figs. 2, 3 and 4 show the progressive stages of the heading operation performed on the blank of Fig. 1, part of Fig. 4 being shown in section;

Fig. 5 is an elevation of a completed valve stem;

Figs. 6 to 9 inclusive are end elevations of Figs. 1 to 4 respectively, viewed from the left of said figures;

Figs. 10 and 11 are end elevations of the opposite ends of the valve stem shown in Fig. 5.

In practicing the present invention a cylindrical solid blank, such as A, of definite length, which may be cut from rod stock, has one end thereof subjected to a swaging or heading operation in a suitable machine. Preferably this heading operation is performed upon the blank, without any preliminary heating, in what is known as a double header machine, the first heading operation of which produces an enlargement such as shown at B in Fig. 2, and the second operation of which changes the form of the head B to that shown at C. The heat generated in the formation of the head B is availed of and facilitates the formation of the head C. After this operation the headed blank is annealed and the head C subjected to a further swaging operation which produces the flattened head D. The blank is then again annealed and subjected to a further swaging operation using appropriately-shaped dies which transform the head D into the head E. In the course of this last swaging operation the metal of the head D is displaced into different planes to provide the concentric faces $e$ and $e'$, the latter being depressed with respect to the former, so as to constitute in effect an annular groove. This groove $e'$, although herein shown as being disposed adjacent the foot of the unenlarged portion of the blank A, may, if desired, be spaced radially from said blank, or more than one such groove may be formed in said face.

The blank of Fig. 4 is now ready to be further acted upon to provide it with the external threads F, the reduced threaded nipple G, the flats H, and the internal bore J, as shown in Figs. 5, 10 and 11, all of which may be done in the conventional manner. It will thus be seen that the blank of Fig. 4, upon being subjected to the conventional finishing operations to provide the parts F, G, H and J, will produce a valve stem which will not necessitate any machining operations for finishing off the foot portion and providing it with a tube-clamping groove.

It has been found in practicing the present invention that notwithstanding the fact that the foot portion of the valve stem is substantially thinner than the foot portion formed in accordance with the methods of formation heretofore practiced, it has substantially greater strength and requires a lesser amount of metal for its production. This saving of metal and the saving of the machining operations upon the foot portion result in a substantial saving in the manufacturing cost, as will be apparent.

While I have shown and described the preferred method of practicing my invention, I do not wish to be limited to the precise number of steps herein disclosed, or to the identical shapes of the heads formed by the various swaging operations, since various modifications thereof may be availed of without departing from the spirit of the invention.

What I claim is:

1. The method of making a blank for a tire valve stem or the like from a cylindrical solid metal blank, which comprises subjecting one end of the blank to swaging operations to provide it with an enlarged substantially flat foot and then cupping said foot to provide it with an annular groove on its face adjacent the blank.

2. The method of making a blank for a tire valve stem or the like from a cylindrical solid metal blank, which comprises subjecting one end of the blank to swaging operations to provide it with an enlarged substantially flat foot and subjecting said foot to an additional swaging operation to increase its diameter and provide it with an annular groove on its face adjacent the blank.

3. The method of making a blank for a tire valve stem or the like from a cylindrical solid metal blank, which comprises subjecting one end of the blank to swaging operations to provide it with an enlarged foot, the faces of which are substantially parallel, and then subjecting said foot to an additional swaging operation to increase its diameter and displace the metal thereof to provide said foot with a bearing face and an annular groove radially inwardly of said bearing face.

4. The method of making a blank for a tire valve stem or the like, which comprises shaping the head of a solid rivet-like blank by a swaging operation to provide said head on its under side with a bearing surface and an annular groove surrounding the shank of the rivet.

In witness whereof, I have hereunto signed my name.

JOHN WAHL.